United States Patent [19]
Lynch

[11] 3,961,643
[45] June 8, 1976

[54] VALVE SHIFTING SYSTEM
[75] Inventor: Peter D. Lynch, Portland, Oreg.
[73] Assignee: Rader Companies, Inc., Portland, Oreg.
[22] Filed: Dec. 2, 1974
[21] Appl. No.: 528,632

[52] U.S. Cl. ................................ 137/610; 243/29; 243/31
[51] Int. Cl.² ......................................... F17D 3/03
[58] Field of Search ................ 137/610; 302/27, 28; 243/29, 31

[56] References Cited
UNITED STATES PATENTS

| | | | |
|---|---|---|---|
| 406,447 | 7/1889 | Kennedy | 243/31 |
| 3,367,603 | 2/1968 | Feyerherd | 243/29 |
| 3,395,731 | 8/1968 | Kauffman | 137/610 |
| 3,762,664 | 10/1973 | Loveless | 243/29 |

FOREIGN PATENTS OR APPLICATIONS

| | | | |
|---|---|---|---|
| 1,014,209 | 12/1965 | United Kingdom | 243/29 |

Primary Examiner—William R. Cline
Assistant Examiner—H. Jay Spiegel
Attorney, Agent, or Firm—Klarquist, Sparkman, Campbell, Leigh, Hall & Whinston

[57] ABSTRACT

A valve shifting system is described for connecting a first conveying line selectively between two or more additional conveying lines. The system includes a conveying line connector mounted on a frame and connected to the first conveying line. A switching plate, also mounted on the frame, has ports therethrough for connection in communication with these additional conveying lines. An arm is slidably engaged to the switching plate and connected to the conveying line connector in a manner permitting rotation and longitudinal motion of the arm as it slides upon the switching plate. The system also includes a pivot tube which is coupled at one end to the arm which at the opposite end is coupled to the conveying line connector. A continuous passageway for the flow of material therethrough is formed from the first conveying line through the pivot tube and switching plate to the selected additional conveying line. During the shifting of the system between conveying lines a drive mechanism coupled to the arm and to the pivot tube moves the pivot tube backwardly away from the switching plate, traverses the pivot tube to the selected switching plate port, and moves the pivot tube forwardly toward the switching plate to form a continuous passageway from the first conveying line to this newly selected port.

14 Claims, 6 Drawing Figures

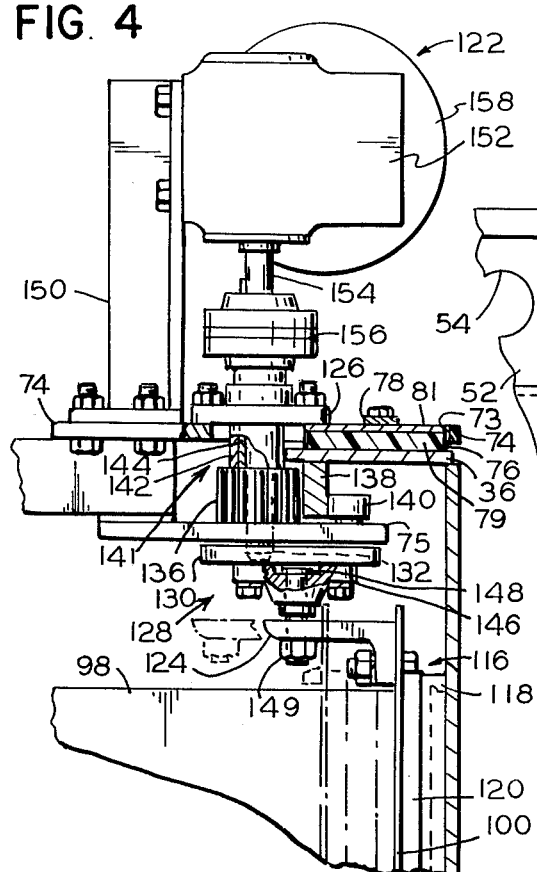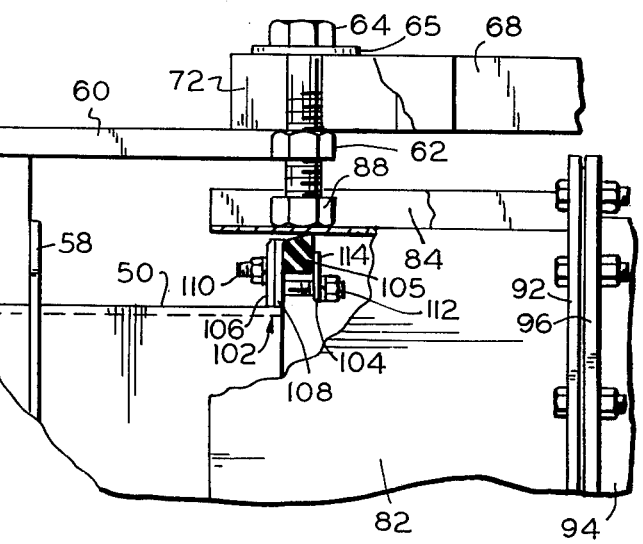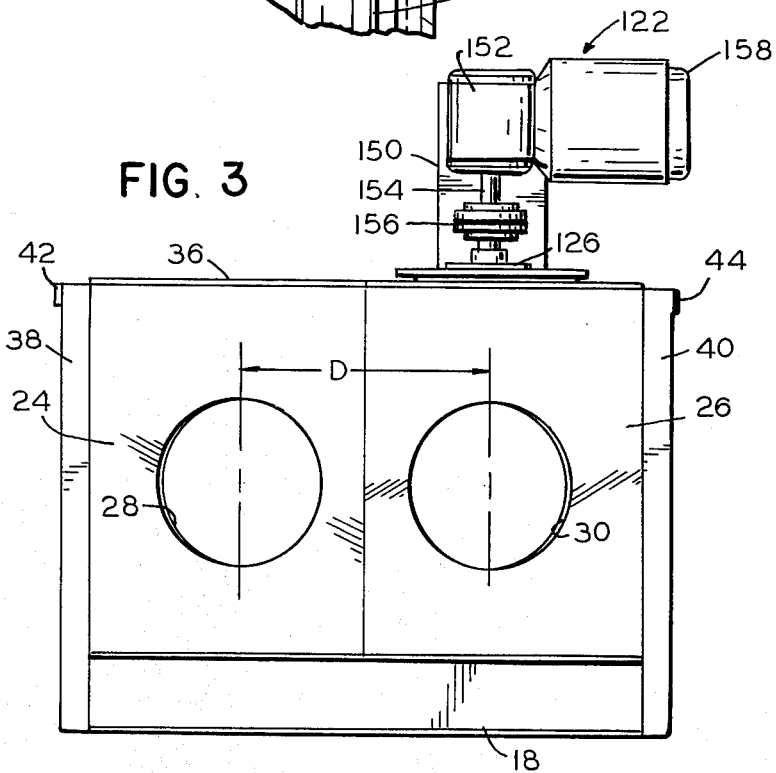

VALVE SHIFTING SYSTEM

BACKGROUND OF THE INVENTION

The subject matter of the present invention relates to a valve shifting system for shifting a conveying line between at least two additional conveying lines. Typically such a system is required when it is desired to transfer material flowing through a conveying line to one location so that it flows through a selected conveying line to another location.

The problem of shifting a conveying line between other conveying lines has been recognized for a long time as evidenced by U.S. Pat. No. 721,743 which was issued in 1903 to Richmond. In Richmond a swing tube section is connected to an inlet conveying line and the opposite end of the swing tube is slid in contact with a vertical plate from one outlet port, located through the plate, to another such outlet port during shifting between ports. In addition, these outlet ports are connected to outlet conveying lines. One problem arising with such a device is the poor sealing of the swing tube to the outlet port arising because the swing tube is slid into position instead of moving from a position away from the plate forward to the desired outlet port. Also problems exist in exactly aligning the swing tube with the outlet ports caused by oversliding the swing tube slightly past the ports or by undersliding the swing tube, which in either case results in misalignment. Since that time numerous other arrangements have been proposed to permit switching between conveying lines, but each proposed heretofore possesses one or more limitations, such as complexity, likelihood of misalignment, etc.

Therefore a need exists for a valve shifting system which is simple, reduces misalignment, which is capable of being used in applications where a first conveying line needs to be shifted to another conveying line which can be selected in the system from among two, three, four, five, or more such other conveying lines, and which is comparatively of inexpensive construction but rugged and serviceable.

SUMMARY OF THE INVENTION

It is one object of the present invention to provide a valve shifting apparatus for connecting a first conveying line between a plurality of other such conveying lines.

Another object of the invention is to provide a valve shifting system which is simple, of efficient design and inexpensive construction.

Still another object of the invention is to provide a valve shifting system having a pivot tube coupled at one end to a first conveyinng line and having its opposite end engaged in communication with another conveying line and in such system the pivot tube is moved backwardly away from this other conveying line during shifting of the apparatus between such other conveying lines and then moved forwardly toward another of such other conveying lines to engage in communication with such other conveying lines.

A further object of the invention is to provide a valve shifting system which provides for accurate alignment of a pivot tube with one of the other conveying lines when the first conveying line is engaged in communication with such other conveying line.

A further object of the invention is to provide a valve shifting system which is trouble free and easy to maintain.

An additional object of the invention is to provide a valve shifting system which may be driven by a single motor, or manually, to cause the shifting of the pivot tube between a plurality of other conveying lines.

BRIEF DESCRIPTION OF DRAWINGS

Other objects and advantages of the present invention will be apparent from the following detailed description of the preferred embodiment and from the attached drawings, of which:

FIG. 3 is an end view of the valve shifting system shown in FIG. 2;

FIG. 4 is an enlarged sectional view of a portion of the valve shifting system taken generally along line 4—4 of FIG. 1;

FIG. 5 is an enlarged sectional view taken along line 5—5 of FIG. 1; and

DETAILED DESCRIPTION OF THE PREFERRED EMBODIMENT

Figure 1:
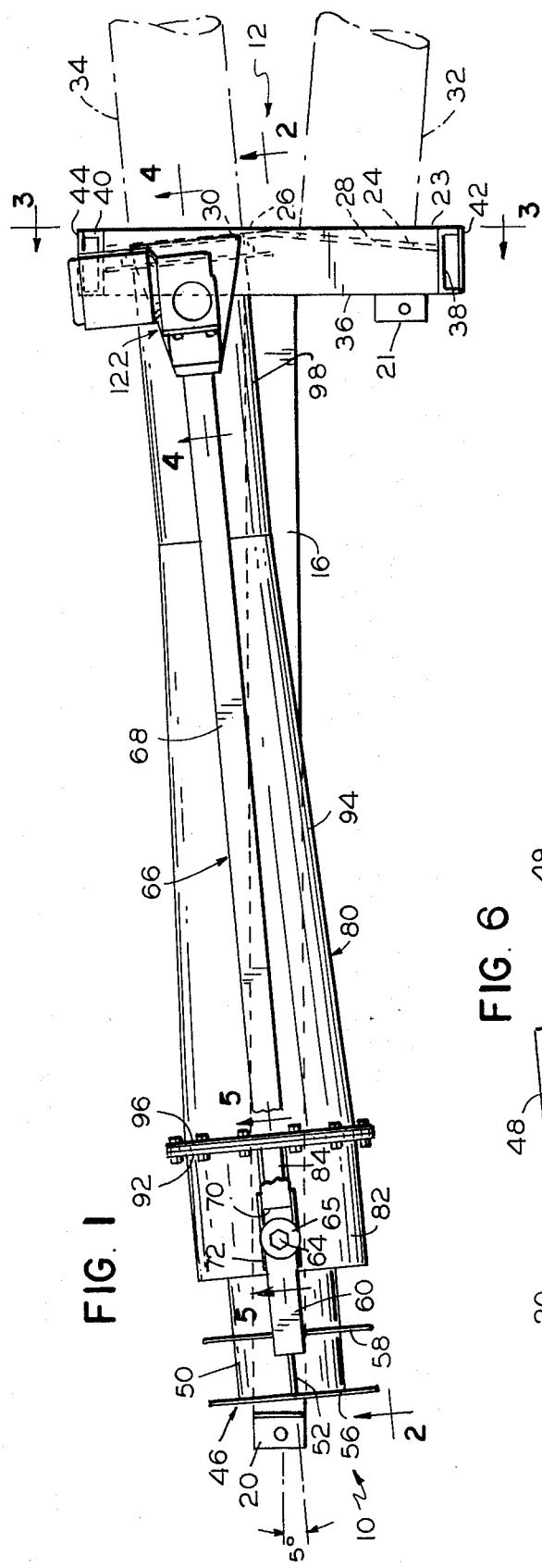
FIG. 1 is a plan view of the valve shifting system of the present invention employed in a conveying system.
Figure 2:
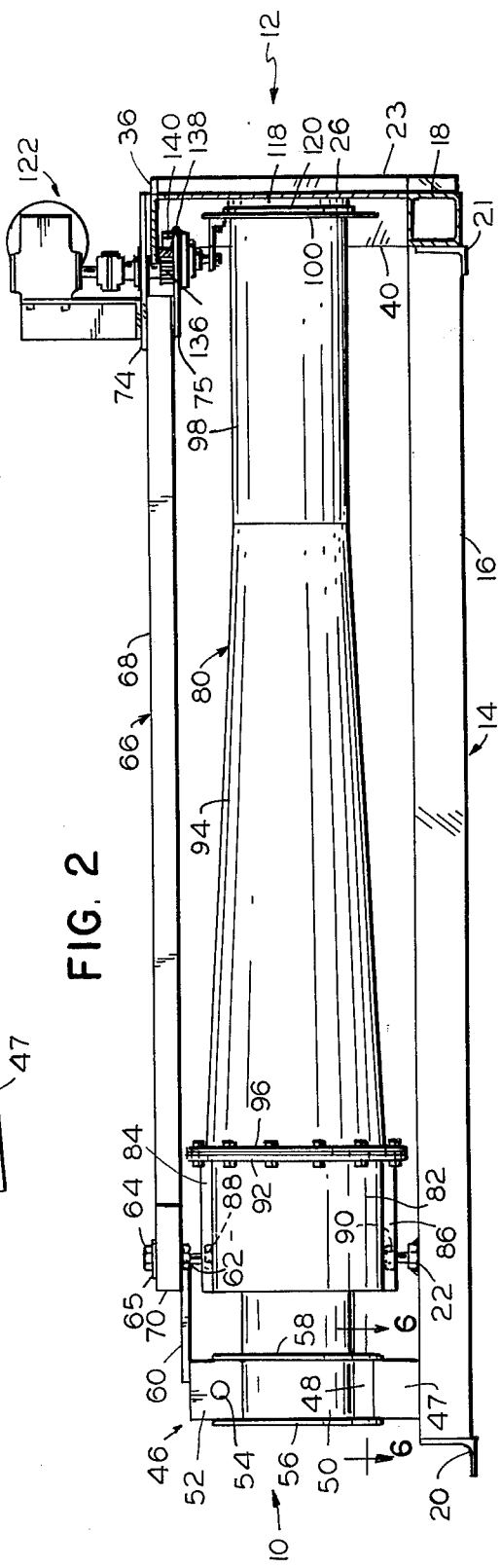
FIG. 2 is a side elevation view partially in section of the valve shifting system of the present invention taken along line 2—2 of FIG. 1.

A preferred embodiment of the valve shifting system in accordance with the present invention is shown in FIG. 1 and 2. For the purpose of facilitating the description, and not to be construed as a limitation, an inlet end 10 and outlet end 12 have been designated.

As shown in FIG. 2 the valve shifting system of the present invention is supported by a frame 14 extending from inlet end 10 to outlet end 12 and which includes a base 16 and a cross piece 18. Cross piece 18 is attached at its center to the end of base 16 which is adjacent to outlet end 12 and is perpendicular to base 16 to form a preferably rigid T-shaped frame. The upper surface of base 16 and of cross piece 18 are, in the embodiment shown, located in the same horizontal plane. Both cross piece 18 and base 16 are preferably constructed of square metal tubing of the same cross sectional area to form a light, but strong and stiff frame.

Three L-shaped mounting brackets 20, 21 (and one not shown) are attached to frame 14. Bracket 20 is mounted to the end of base 16 adjacent to inlet end 10 and the remaining two brackets 21 (and one not shown) are connected to cross piece 18 adjacent its opposite ends. The bases of these brackets are located in a horizontal plane and each have a hole therethrough for mounting the device to a suitable surface. Since any three points always define a plane, the three point mounting formed by these mounting brackets aids elimination of frame distortion and the resulting high stresses and sealing problems which may occur when the valve shifting system is mounted in the field.

A first hex nut 22 is mounted near inlet end 10 along the longitudinal center line of the upper horizontal surface of base 16. The reason for nut 22 will later become apparent as the description continues.

Figure 6:
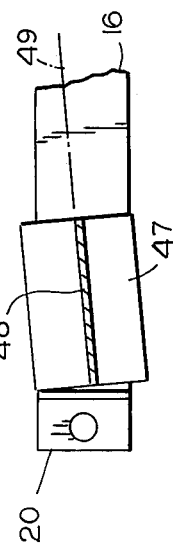
FIG. 6 is a plan view of a portion of the valve shifting system taken generally along line 6—6 of FIG. 2.

A switching plate means indicated generally by the number 23 is mounted to cross piece 18. Switching plate means 23 comprises a pair of preferably rigid planar plates 24, 26 (see FIGS. 2 and 3) which are connected as by welding at their lower edges to the upper surface of cross piece 18 and extend vertically upwardly. Plates 24 and 26 are joined together along adjacent vertical edges with the line formed by this vertical joint intersecting the longitudinal center line of base 16. In addition, plates 24, 26 extend outwardly in opposite directions from the above mentioned vertical joint to the opposite ends of cross piece 18 at an angle so that plates 24, 26 form chords of a circle which has a center at the center of nut 22. As best seen in FIG. 3, a first circular port 28 and a second circular port 30 are centrally located through plates 24, 26, respectively, and have their vertical center lines spaced a straight line distance D apart. As seen in FIG. 1, ports 28, 30 are connected in communication with first outflow conveying line 32 and second outflow conveying line 34, respectively. Referring to FIG. 2, a support bar 47 is shown, which is also mounted to the upper horizontal surface of base 16, at a location between nut 22 and inlet end 10. The longitudinal centerline 49 of support bar 47 is located on a line which has been rotated approximately five degrees counterclockwise from the longitudinal centerline of base 16, as best shown in FIG. 6. For reasons which will later become apparent when the longitudinal centerline 49 is extended it intersects the vertical centerline of port 30 and outflow conveying line 34.

A sliding plate 36 which in the preferred embodiment is of rectangular shape, is mounted to the upper edge of plates 24, 26. Sliding plate 36 extends in a horizontal plane from plates 24, 26 in a direction toward inlet end 10 of the valve shifting system. End supports 38, 40 constructed from channel iron are attached to the outer edges of plates 24, 26 and also are attached to the corresponding end of cross piece 18. In FIG. 2 and FIG. 4 end support 38 has been broken away for clarity. As seen in FIG. 3 end supports 38, 40 extend vertically upwardly from the lower edge of cross piece 18 to the upper edge of plates 24, 26 and help secure plates 24, 26 in place. Rectangular brace strips 42, 44 extend across the channel of end supports 38, 40 near their upper edges to further strengthen switching plate means 23.

Referring to FIGS. 2 and 6, conveying line connector means 46 is located at inlet end 10 and includes a first planar web 48 having one edge secured to support bar 47 and extending perpendicularly upwardly from support bar 47 along the longitudinal center line 49. A connector pipe section 50 is mounted to first web 48 so that the axis of connector pipe section 50 is in the vertical plane which contains longitudinal center line 49 and is in line with the center of port 30. Typically connector pipe section 50 will have a diameter of from 10 to 16 inches and the inlet and outlet conveying lines will be similar size. A second planar web 52 extends vertically upwardly from connector pipe section 50 and lies in the same plane as web 48. Second web 52 has a support hole 54 through it for use in combination with rectangular brace strips 42, 44 to form three mounting points when it is desired to mount the system from above.

A first annular brace flange 56 is attached to connector pipe section 50 and also to the inlet edge of webs 48, 52, as well as the inlet edge of support bar 47. A second annular brace flange 58 parallel to flange 56 is attached to connector pipe section 50 and to the outlet edges of support bar 47 and webs 48, 52. Flanges 56, 58 strengthen webs 48, 52 and support bar 47 in a rigid relationship to each other.

As best shown in FIG. 5, a rigid bar 60 extends parallel to the axis of connector pipe section 50 and is connected to the upper edge of second web 58. A second hex nut 62 is mounted to the outlet edge of bar 60 so that the center of nut 62 is on a vertical axis which passes through the center of nut 22. A threaded bolt 64 which has a circular disc or flange 65 secured to its head extends downwardly through nut 62 to serve as a first pivot pin for a reason that will later become apparent.

Arm means indicated generally by the number 66 in FIG. 2 includes an arm bar 68 preferably constructed of square metal tubing, which extends from bar 60 to outlet end 12. A bifurcated end piece 70 fits rigidly to the inlet end of arm bar 68 and comprises a pair of rectangular legs 72 which project parallel to the sides of arm bar 68 toward inlet end 10 and straddle bolt 64. As can be seen in FIG. 4, arm bar 68 terminates adjacent to outlet end 12 in an upper plate portion 74 and a lower plate portion 75. Upper plate portion 74 is slidably engaged to sliding plate 36. Arm bar 68 is free to rotate about bolt 64 as well as slide longitudinally with respect to bolt 64 when upper plate portion 74 slides on sliding plate 36. Upper plate portion 74 has rectangular openings cut therethrough, one of which is indicated at 73 in FIG. 4. Each opening has a skid pad 76 inserted therein which is held in contact with sliding plate 36 by a brace 78 which is fastened to the upper surface of upper plate portion 74 across the opening 73. Skid pads 76 comprise a low friction plastic portion 79 which engages plate 36 and a supporting top portion 81. The skid pads 76 float freely within the openings 73 so that they may be easily replaced as they wear out.

Again looking at FIG. 2, a pivot tube 80 extends from conveying line connector means 46 to switching plate means 23 and is supported at the end adjacent the latter by arm 66. The pivot tube 80 includes a first circular pipe section 82 which has a diameter larger than the diameter of connector pipe section 50 and has a first pair of parallel projecting flanges 84 which extend upwardly and a similar second pair of projecting flanges 86 which extend downwardly. Each pair of parallel flanges 84, 86 forms a channel which is symmetrical about a vertical plane which passes through the center of pipe section 82 and also intersects the axis through the centers of nuts 22, 62. A hex nut 88 is threaded to the lower end of bolt 64 and a hex headed bolt 90 is screwed into nut 62 to form a second pivot pin. Nuts 62, 22 and bolts 64, 90 are located along the same vertical axis and together in the preferred embodiment form a simple, but reliable, pivot means for the pivot tube 80. The head of hex bolt 90 slides within the channel formed by the projecting flanges 86 and nut 88 slides within the channel formed by the flanges 84 in order to guide the longitudinal motion of pivot tube 80. Additionally, the longitudinal motion allowed by these channels prevents the lifting and lowering of the outlet end of pivot tube 80 if flexing or misalignment of conveying line connector means 46 occurs. Pivot tube 80 is also free to rotate about the vertical axis containing bolts 64 and 90 as it slides longitudinally.

Pipe section 82 has an annular flange 92 at its outlet end. Pivot tube 80 also includes a conical taper tube section 94 which, in the preferred embodiment, has an annular flange 96 at its inlet end. Flanges 92, 96 are bolted together with a gasket between them thus forming a sealed continuous passageway between section 82 and section 94. The cross sectional area of the passageway through the inlet end of taper tube section 94 is preferably approximately only sixty percent larger than the cross sectional area of the passageway through connector pipe section 50. This relatively small expansion in cross sectional areas when material flows from connector pipe section 50 into taper tube section 94, in comparison to many existing shifting systems, reduces the energy loss of material flowing through the system. In addition conical taper tube section 94 helps reduce flow losses and wear on the device because of the small impact angle of conveyed material with the sides of the taper tube 94. A second circular pipe section 98 is connected directly to the outlet end of taper tube section 94 and is of the same diameter as connector pipe section 50. An annular support flange 100 is mounted to pipe section 98 at a location which is slightly recessed from the outlet end of pipe section 98.

As can be seen in FIGS. 1 and 2, connector pipe section 50 extends concentrically within first pipe section 82. Referring to FIG. 5, located between pipe sections 50 and 82 is a first sealing means 102 to seal the opening between pipe sections 50 and 82 against leakage of air and fine material. First sealing means 102 includes seal cartridge means 104 for holding an annular gasket or seal 105 of suitable resilient material such as rubber. Seal cartridge means 104 includes an annular mounting flange 106 fixed to connector pipe section 50 near its outlet end and which flange has circumferentially spaced holes (not shown) therethrough. A ring member 108 is bolted to the outlet surface of annular mounting flange 106 by a plurality of studs, one of which is indicated by the number 110, which project from the inlet surface of ring member 108 through the circumferentially spaced holes in flange 106. A second set of circumferentially spaced studs, one of which is indicated by number 112, extend from the outlet surface of ring member 108. Threaded ellipse shaped tabs, one being indicated by the number 114, are screwed onto studs 112 and are then secured by nuts. Annular seal 105 floats freely between ring member 108 and tabs 114 and is in snug contact with first pipe section 82 thereby preventing the leakage of air and fine material between pipe section 82 and connector pipe section 50. Since the sealing surface is internal to pivot tube 80 it is protected from dirt and the weather and there is no place for fine material to build up and pack around first sealing means 102.

A second sealing means 116, see FIG. 4, is located at the outlet end of pivot tube 80 for engaging plates 24, 26. Second sealing means 116 comprises a cylindrical flexible gasket 118 which is clamped by a releasable band clamp 120 to the end of pipe section 98 and projects from the latter. Band clamp 120 retains gasket 118 in place so it cannot blow or be pulled off, yet allows quick and easy replacement of the gasket if it becomes necessary.

The drive means for arm 66 and pivot tube 80 is indicated generally by number 122 and will be described with reference to FIG. 4. Drive means 122 includes an angle bracket 124 which is bolted to the inlet surface of annular support flange 100 and projects in a horizontal plane toward inlet end 10. Drive means 122 also includes an eccentric means 128 which includes a crank weldment 130 which is located adjacent to the lower surface of lower plate portion 75 and has a slight clearance from lower plate portion 75. A first drive shaft 132 is connected to crank weldment 130 and extends vertically upwardly from crank weldment 130 through an opening in lower plate portion 75 and thence through an opening in upper plate portion 74 and through a first flange bearing 126 which is bolted to the upper surface of upper plate portion 74. A gear means, which in the present embodiment is a spur gear 136, is keyed to shaft 132 adjacent to the upper surface of lower plate portion 75 and prevents downward motion of shaft 132 and crank weldment 130. When shaft 132 is rotated, both the spur gear 136 and the crank weldment 130 rotate about the axis of shaft 132. A gear rack means, which in this embodiment is a gear rack 138, is mounted to and extends perpendicularly downwardly from the lower surface of sliding plate 36 and is parallel to cross piece 18. The operative surface of gear rack 138 faces inlet end 10 for engagement with spur gear 136. A cam roller 140 is secured to the upper surface of lower plate portion 75 so that it rolls along the outlet surface of gear rack 138. A roller means 141 includes a drill jig liner 142 which fits on shaft 132 immediately above spur gear 136. A bushing 144 is pressed into drill jig liner 142 between liner 142 and shaft 132. Roller 141 rotates freely about shaft 132 and also is free to move longitudinally along shaft 132 between upper flange bearing 126 and spur gear 136. Roller 141 rolls along the inlet edge of horizontal sliding plate 36. Since cam roller 140 prevents shaft 132 from moving toward the inlet end and drill jig liner 142 prevents shaft 132 from moving toward the outlet end, spur gear 136 is held in a proper relationship to gear rack 138.

In the preferred embodiment gear rack 138 is a straight gear rack section. Thus, the distance from gear rack 138 to bolt 64 will vary from point to point along gear rack 138. Therefore, in order for spur gear 136 to engage gear rack 138 at all times, it is necessary that arm means 66 be free to longitudinally move with respect to bolt 64 to adjust to the changing distance between bolt 64 and gear rack 138. If a curved gear rack was instead employed, the distance from bolt 64 to gear rack 138 could be made constant and arm means 66 would not be required to move longitudinally with respect to bolt 64.

A counterbored second flange bearing 146 is bolted to the lower surface of crank weldment 130. A shoulder screw 148 passes through second flange bearing 146 and has a head of a greater diameter than the diameter of the opening through flange bearing 146 so that shoulder screw 148 will not slip downwardly through flange bearing 146. Shoulder screw 148 passes downwardly through angle bracket 124 and is secured by a nut 149. When connected in this manner, shoulder screw 148 supports the outlet end of the pivot tube 80 and permits the rotation of the outlet end of pivot tube 80 about the axis of shoulder screw 148. As will be explained below, it is central to the operation of the preferred embodiment that the axis about which the outlet end of the pivot tube 80 rotates not be in line with the axis about which the gear means, in this case spur gear 136, rotates.

Rotation of shaft 132 causes spur gear 136 to traverse in gear rack 138 thereby moving the outlet end of arm means 66 and pivot tube 80 along switching plate means 26 in a direction determined by the direction of rotation of shaft 132. In addition, rotation of shaft 132 causes crank weldment 130 to rotate, which in turn moves the pivot tube section in a circle with a diameter equal to the throw distance. The throw distance is defined to be twice the distance from the axis of shoulder screw 148 to the axis of first drive shaft 132. The outlet end of pivot tube 80 moves in a cycloidal path due to this combination traversing and circular motion. If the throw distance were zero there would be no circular motion of the outlet end of pivot tube 80 and consequently no cycloidal motion of such pivot tube end and only a traversing of such pivot tube end between ports. Therefore, the outlet end of pivot tube 80 would not move forwardly and backwardly to engage in and disengage from communication with outlet ports 28, 30 during shifting.

In summarizing the operation of the device, assume that the device is connected in the flow configuration shown in FIG. 1. The inlet conveying line would be connected to connector pipe section 50 which in turn is in communication with pivot tube 80. The outlet end of pivot tube 80 is in a sealed engagement with outlet conveying line 34 through outlet port 30. Due to the previously indicated five degree angle of rotation of connector pipe section 50, when in this flow configuration the centers of connector pipe section 50, pivot tube 80 and port 30 are aligned so that material flows straight through the valve shifting system with minimal flow resistance encountered by the stream of material. Therefore the first flow configuration would normally be the one most often used. Next assume that it is desired to shift the system to a position so that the inlet conveying line is in sealed communication with outlet conveying line 32 through outlet port 28. This is accomplished by rotating drive shaft 132 which causes spur gear 136 to rotate while engaged with gear rack 138. This in turn will cause arm bar 68 to move about bolt 64 and also cause upper plate portion 74 to slide along sliding plate 36. Since the outlet end of pivot tube 80 is supported by arm means 66 pivot tube 80 will move with arm means 66. Thus, as the spur gear 136 traverses rack 138 both the arm 66 and the pivot tube will swing to the desired port 28. At the same time the traversing motion is occurring, first drive shaft 132 is causing crank weldment 130 to rotate. This in turn causes shoulder screw 148 to rotate about the axis of shaft 132 and causes pivot tube 80 to follow a cycloidal path as previously described as it shifts between the desired ports.

As will be later explained the pitch circle radius of spur gear 136, the throw distance and the distance D between ports are designed so that pivot tube 80 will move forwardly to contact switching plate means 36 in communication with an outlet port. Accurate alignment of pivot tube 80 with the outlet ports is assured by the system design. Vertical alignment occurs because the outlet end of pivot tube 80 is maintained in a fixed vertical position because it is coupled to upper plate portion 74 which slides in contact with horizontal sliding plate 36. Horizontal alignment is guaranteed because the cycloidal motion of the outlet end of pivot tube 80 is such that pivot tube 80 moves forwardly to engage switching plate means 36 when its center is aligned with the center of the selected outlet port, which in this case is port 28.

The outlet end of pivot tube 80 will move forwardly and engage in a sealed contact with outlet port 28 and outlet conveying line 32 due to the above described cycloidal motion and in this manner completes the shifting process. When it is desired to shift back to the first flow configuration the rotation of first drive shaft 132 is simply reversed.

In the preferred embodiment a motor mounting bracket 150 is bolted to upper plate portion 74 and extends vertically upwardly. A gear speed reducer 152 is mounted directly to the upper portion of motor mounting bracket 150. A second drive shaft 154 extends from gear speed reducer 152 downwardly toward first drive shaft 132. Shaft 154 and shaft 132 are coupled together by a chain coupling 156 so that rotation of shaft 154 causes a similar rotation of shaft 132. A motor 158 is engaged to gear speed reducer 152 so that operation of the motor causes shaft 154 to rotate, at a speed determined by gear speed reducer 152, which in turn causes the rotation of shaft 132 to produce the motion of the outlet end of pivot tube 80 between ports as previously described.

With the entire drive means 122 being located above pivot tube 80 and outlet ports 28, 30 it is free of dirt and chip build up which otherwise could interfere with its operation.

It must be appreciated that first drive shaft 132 can be rotated in any manner to produce the desired result. For example, a manual rotating means such as a wheel may be connected to first drive shaft 132 so that by turning the wheel shaft 132 will rotate and produce the shifting of the valve shifting system. Furthermore, by moving arm means 66, for example by pushing or pulling on upper plate portion 74 to cause sliding of plate portion 74 on sliding plate 36, since arm means 66 is coupled to shaft 132, spur gear 136 will traverse along gear rack 138 as arm means 66 is moved thereby rotating shaft 132 and thus causing the shifting of the apparatus.

Although a two port outlet has been described, one of the advantages of the present invention is the fact that the valve shifting system is easily adaptable to serve three, four, five or more outlet ports. This is done simply by adding the desired number of planar plates having ports to the switching plate means 23 and also extending the gear rack 138 and sliding plate 36. The only limitation on the number of such ports arises because the arc through which pivot tube 80 may swing before being stopped by connector pipe section 50 is limited. Lengthening pivot tube 80 increases the circumferential distance over which the outlet end can swing before being stopped by connector pipe section 50, consequently a greater number of outlet ports can be served in comparison to the number of ports which can be served by a shorter pivot tube. Additionally, only one motor is required to operate the valve shifting system even in a multi-port application.

In the preferred embodiment the pitch circle radius of spur gear 136 is equal to one half the throw distance and the pitch circle circumference of spur gear 136 is equal to one half the distance D between the vertical center lines of the ports. Due to this relationship the outlet end of pivot tube 80 will follow two cycloidal cycles in moving from one to said ports to an adjacent port. The forward motion which occurs midway between the ports does not bring the outlet end of pivot tube 80 in contact with plates 24, 26 because sufficient clearance exists due to this fact plates 24, 26 angle outwardly from the point midway between the ports as previously described. By adjusting the relationships of these three distances any number of cycloidal motions can be made to occur as pivot tube 80 moves between ports. For example, if the pitch circle radius is equal to one half the throw distance and the pitch circle circumference is equal to one third the distance between the ports, the outlet end of pivot tube 80 will follow three cycloidal motions in moving from one port to an adjacent port.

As will be apparent one of the advantages of the construction shown is that because of the floating connection of the pivot tube 80 to the pipe section 50, expansion or contraction of the conveying lines and resulting movement of pipe section 50 and switching plate means 23 toward or away from each other does not affect the operation of the device since the pivot tube 80 is free to move longitudinally on pipe section 50 to compensate for any relative movement between pipe section 50 and switching plate means 23. Also, vertical adjustment of the discharge end of pivot tube 50 can be made freely without affecting the pivot action of tube 50.

It will be further observed that the switching is obtained through a single motor with only one kinematic mechanism. Moreover, the input torque requirements are lowest at the beginning and termination of the cycloidal movement thus avoiding the problems associated with high starting loads on the driving motor.

While skid pads 79 are of a low friction material, their coefficient of friction is substantially greater than that of rollers, and purposely so, so that the friction of the pads will provide a braking action to arrest motion of the shifting mechanism when power to the motor is cut off. Thus a motor brake is not necessary as would be if the shifting mechanism were supported on sliding plate 36 by rollers.

While arm bar 66 is shown as supported on conveying line means, it will be apparent that the end of arm bar 66 remote from the switching plate means 36 could be supported at some other location on and along pivot tube 80. Among other things arm bar 66 lends stability to the support of motor 158 resists the torque of motor 158 and causes the drive head assembly to traverse the desired path. Other means for accomplishing these functions will be apparent.

By causing the discharge end of pivot tube 80 to move between ports 28, 30 in two "hops" or cycloidal paths, the longitudinal movement of the tube 80 is minimized.

While I have shown and described a preferred embodiment of my invention, it will be apparent to those skilled in the art that many changes and modifications may be made without departing from my invention in its broader aspects.

I claim:

1. A shifting apparatus for connecting a first conveying line between a plurality of other conveying lines comprising:
   a frame,
   switching plate means mounted on said frame, said switching plate means having at least two ports for communication with said other conveying lines,
   conveying line connector means mounted on said frame, and adapted to be connected to said first conveying line,
   a pivot tube,
   means pivotally connecting one end of said pivot tube to said conveying line connector means permitting longitudinal motion of said pivot tube and rotation of said pivot tube about an axis perpendicular to the longitudinal axis of said pivot tube,
   the opposite end of said pivot tube being adapted to be placed selectively in communication with said ports to form a continuous passageway from said conveying line connector means through said pivot tube and said switching plate means, and
   drive means operatively connected to said opposite end of said pivot tube for swinging said pivot tube opposite end from a first position adjacent to one of said ports to a second position adjacent to another of said ports,
   said drive means including a drive shaft and a crank connected to said drive shaft for rotation about the axis of said shaft, said crank also being pivotally connected to said pivot tube for rotation about an axis offset a fixed distance from said shaft axis and said crank being rigid between said axes such that rotation of said crank about said shaft axis moves said opposite end of said pivot tube alternately away from and toward said switching plate means during swinging movement of said pivot tube between said first and second positions.

2. A shifting apparatus according to claim 1 including first sealing means between said pivot tube and said conveying line connector means, to prevent leakage of fine material and second sealing means also between said pivot tube and said switching plate means for preventing leakage of fine material when said pivot tube is in communication with a one of said ports.

3. A shifting apparatus according to claim 2 wherein said first sealing means comprises seal cartridge means mounted on said conveying line connector means, an annular seal held by said seal cartridge means, said annular seal extends between said seal cartridge means and said pivot tube in a manner which permits said pivot tube to slide longitudinally in contact with said annular seal and to rotate about said annular seal in a plane parallel to the axis of said pivot tube when the shifting apparatus is moved between said first and second ports.

4. A shifting apparatus for connecting a first conveying line between a plurality of other conveying lines comprising:
   a frame,
   switching plate means mounted on said frame, said switching plate means having at least two ports for communication with said other conveying lines,
   conveying line connector means mounted on said frame, and adapted to be connected to said first conveying line,
   a pivot tube,
   means pivotally connecting one end of said pivot tube to said conveying line connector means permitting longitudinal motion of said pivot tube and rotation of said pivot tube about an axis perpendicular to the longitudinal axis of said pivot tube,
   the opposite end of said pivot tube being adapted to be placed selectively in communication with said ports to form a continuous passageway from said conveying line connector means through said pivot tube and said switching plate means,
   drive means operatively connected to said opposite end of said pivot tube for swinging said pivot tube opposite end from a first position adjacent to one of said ports to a second position adjacent to another of said ports,
   said drive means including eccentric means coupled to said pivot tube for moving said pivot tube backwardly away from and forwardly toward said switching plate means, an arm means slidably supported at one end thereof on said switching plate means, means connecting one end of said arm means to said drive means, and means pivotally connecting the opposite end of said arm means to said pivot tube at a position spaced from said switching plate means for rotation of said arm means about an axis parallel to the axis of rotation of said pivot tube.

5. A shifting apparatus according to claim 4 wherein said eccentric means includes drive shaft means operatively connected to said arm means, and said drive means includes gear rack means mounted on said switching plate means, gear means mounted on said drive shaft means and engaged with said gear rack means, and means for rotating said drive shaft means whereby said arm means is moved from said first position to said second position and said pivot tube is moved between said ports simultaneously with the movement of said arm means and with the forward and backward motion of said pivot tube by said eccentric means.

6. A shifting apparatus according to claim 4 wherein said means connecting one end pivotally of said pivot tube to said conveying line connector means includes a first pivot pin mounted on said conveying line connector means and extending between said pivot tube and said arm means, said arm means being coupled to said first pivot pin in a manner permitting longitudinal motion of said arm means and also rotation of said arm means about said first pivot pin, a second pivot pin mounted on said frame and extending from said frame to said pivot tube, and channels mounted on said pivot tube, said pivot tube being adapted to rotate about said first and second pivot pins and said pivot pins being slidably engaged to said channels for guiding the forward and backward motion of said pivot tube.

7. A shifting apparatus for connecting a first conveying line between a plurality of other conveying lines comprising:

a frame, switching plate means mounted on said frame, said switching plate means having a plurality of ports for communication with said other conveying lines, conveying line connector means mounted on said frame, and adapted to be connected to said first conveying line, arm means extending from said conveying line connector means to said switching plate means, said arm means being pivotally connected to said conveying line connector means and supported by said switching plate means in a manner permitting sliding of said arm means on said switching plate means while said arm means rotates about said conveying line connector means, a pivot tube supported at one end by said arm means and coupled at the opposite end to said conveying line connector means in a manner permitting rotation of said pivot tube about an axis parallel to the axis of rotation of said arm means and forward and backward motion of said pivot tube relative to said switching plate means, said pivot tube being adapted to be positioned selectively in communication with said ports to form a continuous passageway from said conveying line connector means through said pivot tube and said switching plate means, and drive means for shifting the end of said pivot tube adjacent to said switching plate means between said ports in a cycloidal path.

8. A shifting apparatus according to claim 7 wherein said switching plate means has only two ports.

9. A shifting apparatus according to claim 7 wherein said drive means includes eccentric means for moving said pivot tube forwardly toward said switching plate means and backwardly away from said switching plate means, gear rack means mounted on said switching plate means, and gear means engaged with said gear rack means for moving said pivot tube between said ports simultaneously with the forward and backward motion of said pivot tube by said eccentric means and thereby producing the cycloidal motion of said pivot tube end.

10. A shifting apparatus according to claim 9 wherein said eccentric means includes drive shaft means, said gear means being mounted on said drive shaft means, and said drive shaft means being operatively connected to said arm means for causing said gear means to traverse on said gear rack means as said arm means slides on said switching plate means thereby rotating said drive shaft means for driving said eccentric means to produce the cycloidal motion of said pivot tube end.

11. A shifting apparatus according to claim 9 wherein said eccentric means includes drive shaft means, said gear means being mounted on said drive shaft means, said drive means including means for rotating said drive shaft means to produce the cycloidal motion of said pivot tube end.

12. A shifting apparatus according to claim 11 including a motor mounted on said arm means and coupled to said drive shaft means to rotate said drive shaft means and produce the cycloidal motion of said pivot tube end.

13. A shifting apparatus according to claim 11 wherein said switching plate means comprises a vertical member extending perpendicularly from said frame, said ports passing through said vertical member, and a horizontal plate member projecting perpendicularly from said vertical plate member toward said conveying line connector means, said arm means including an upper plate portion supported by said horizontal plate member, said upper plate portion having a skid pad in sliding engagement with said horizontal plate member, said upper plate portion also having an opening for passage of said drive shaft means therethrough, said arm means including a lower plate portion extending parallel to said upper plate portion toward said switching plate means and having an opening therethrough for passage of said drive shaft means, said gear rack means being mounted perpendicularly to said horizontal plate member on the side of said horizontal plate member adjacent to said lower plate portion, said gear means being located between said lower plate portion and said upper plate portion, and roller means axially mounted on said drive shaft means for rolling in contact with the edge of said horizontal plate member adjacent to said drive shaft means, cam roller means mounted on said lower plate portion for rolling in contact with the side of said gear rack means adjacent to said vertical plate member, said roller means and said cam roller means maintaining said gear means in contact with said gear rack means when said pivot tube is being shifted between said ports.

14. A shifting apparatus according to claim 11 wherein said gear means has a pitch circle circumference equal to one half the distance between the vertical centerlines of said ports, said eccentric means having a throw distance equal to the diameter of said pitch circle for moving said end adjacent to said switching plate means through two cycloidal cycles during the shifting of said pivot tube from one of said ports to an adjacent port.

* * * * *